United States Patent [19]

Lee et al.

[11] 4,263,536
[45] Apr. 21, 1981

[54] CONTROL CIRCUIT FOR A MOTOR-DRIVEN DOOR OPERATOR

[75] Inventors: Maw H. Lee, Broadview Heights; Chun F. Chen, North Canton, both of Ohio

[73] Assignee: Clopay Corporation, Cincinnati, Ohio

[21] Appl. No.: 931,668

[22] Filed: Aug. 7, 1978

[51] Int. Cl.³ .............................................. H02P 1/22
[52] U.S. Cl. .................................. 318/266; 307/126; 318/258; 318/468
[58] Field of Search ................ 307/126, 125; 318/266, 318/267–269, 468, 469, 258, 282

[56] References Cited

U.S. PATENT DOCUMENTS

| | | | |
|---|---|---|---|
| 2,558,032 | 6/1951 | Andrews | 318/266 |
| 2,883,182 | 4/1959 | Bornemann | 74/89.15 |
| 3,733,747 | 5/1973 | Fox et al. | 318/266 |
| 4,119,896 | 10/1978 | Estes et al. | 318/266 |

*Primary Examiner*—David Smith, Jr.
*Attorney, Agent, or Firm*—Wood, Herron & Evans

[57] ABSTRACT

A door operator includes a motor-driven mechanism to move a door between an open position and a closed position in response to activation of an improved control circuit. The improved control circuit includes circuitry to initialize the sequence of operation of the motor upon connection of power after installation of the door operator or upon restoration of power after a power outage. Obstruction detection circuitry is also included in the control circuit to stop or reverse the motor if the door encounters an obstacle during movement between the open and closed positions. Time delay circuitry cooperates with the obstruction detection circuitry so as to prevent stopping or reversing the motor due to the inertia of the door and of the drive mechanism as the door starts to open or close upon activation of the control circuit. During the time delay period, however, further manual activation of the control circuit is operative to stop and/or reverse movement of the door. As the door moves in one direction, movement can be stopped and restarted in the opposite direction upon consecutive manual activations of the control circuit. When the door nears the closed position, timer circuitry is activated to energize the motor for a predetermined time or until sufficient resistance to door movement is met to activate the obstruction detection circuitry whereupon the motor is stopped. Maximum run-time circuitry is also included to set the maximum time allowable for energization of the motor to move the door in either direction between the open and closed positions.

7 Claims, 10 Drawing Figures

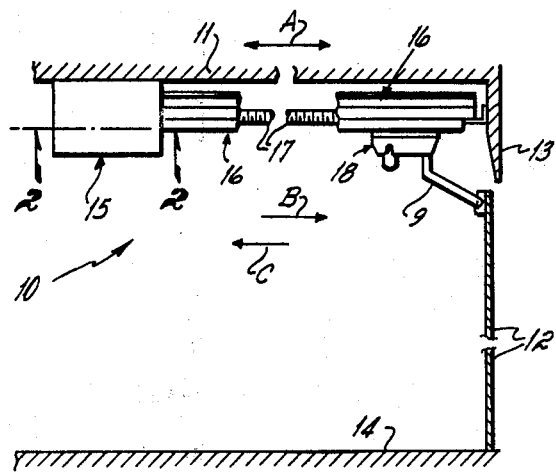
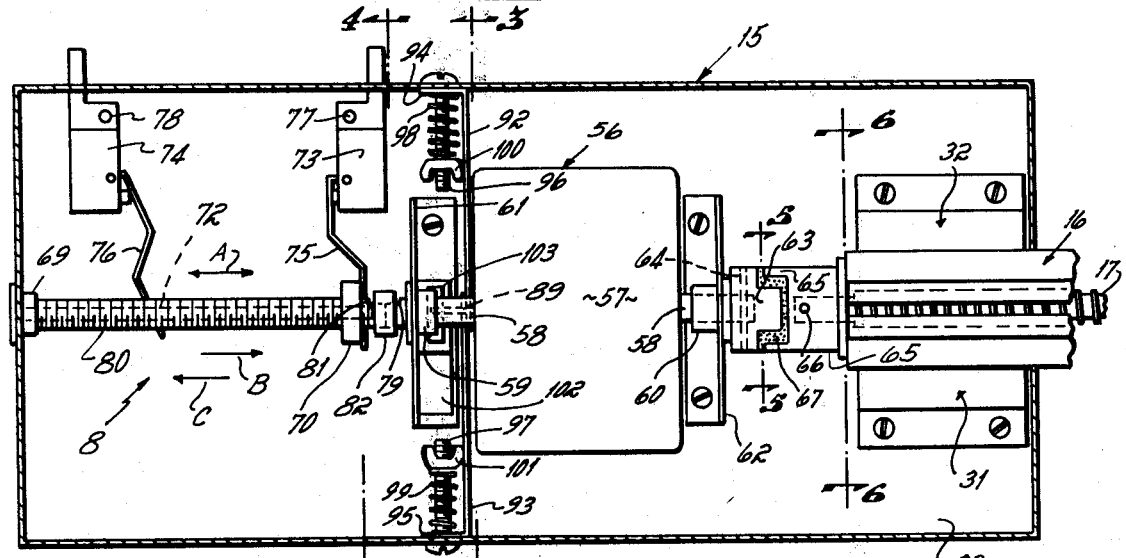
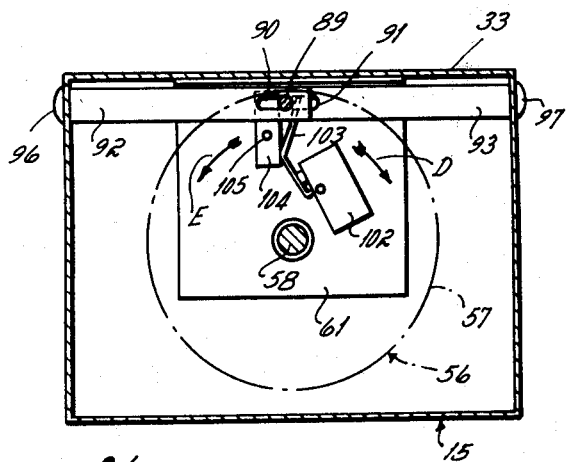
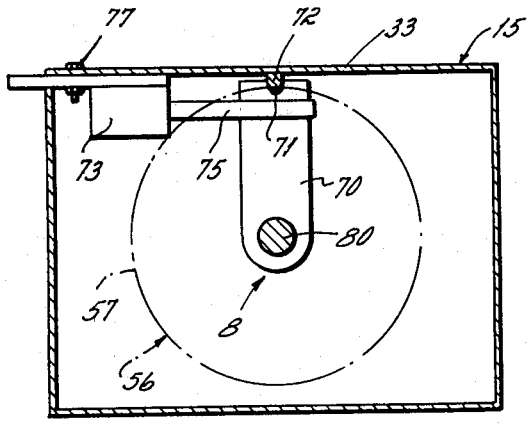
Fig. 1
Fig. 2
Fig. 3
Fig. 4

CONTROL CIRCUIT FOR A MOTOR-DRIVEN DOOR OPERATOR

BACKGROUND OF THE INVENTION

The present invention relates to operators for doors, such as overhead garage doors. More particularly, the present invention relates to motor-driven door operators in which a motor, such as an alternating current induction motor, actuates a drive mechanism connected to a door to move the door between an open position and a closed position in response to activation of a control circuit. Specifically, the present invention is directed to an improved control circuit for the motor.

Typically, commercial door operators are packed and shipped as a unit. That is, the shipping carton accommodates both the motor and the drive mechanism. While installation of the door operator is facilitated, there is an economic disadvantage. In the case of a door operator of the screw type, for example, in which the drive mechanism comprises a track, a drive screw and a shuttle, the carton is very expensive due to the fact that the motor is substantially wider than the drive mechanism, but both are shipped in a carton wide enough to accommodate the motor.

In prior art door operators, after installation and connection of power or after a power outage and subsequent restoration of power, there is a proneness for loss of sequence of operation of the motor. That is, if the door is in the open position, nevertheless, upon activation of the control circuit the door is driven in the opening direction, or, if the door is in the closed position, the door is driven in the closing direction. This can result in damage to the door operator.

Additionally, for safety, many prior art door operators stop or reverse movement of the door if the closing door should engage an obstacle, such as a person or some object. Also, in order to protect the motor, some door operators are sensitive to obstacles engaged during door opening so that the motor is stoped before damage results from overheating.

The prior art door operators employ different approaches to provide increased sensitivity. Some approaches for increased sensitivity to obstructive forces, however, have met with the problem that the inertia of the door, which has a considerable weight, and of the drive mechanism at rest is such that the sensitivity must be set so that the obstruction detection means does not stop or reverse the motor each time movement of the door is initiated. Consequently, many prior art door operators are sensitive only to obstructive forces in excess of the inertia of the door and of the drive mechanism at rest. As a result, injury or damage, such as denting the hood of an automobile in the path of the door, can result before the obstructive forces exceed the inertial force to cause stopping or reversing of the motor.

One approach for increasing the sensitivity of the door operator to obstructions is shown in U.S. Pat. No. 2,533,116 which includes a dashpot to prevent activation of safety switches due to the inertia of the door and of the drive mechanism when movement of the door is initiated. The apparatus in U.S. Pat. No. 2,533,116, however, is mechanically complex and, consequently, expensive.

As an alternative, U.S. Pat. No. 4,010,408 incorporates cutoff switches to override the function of safety switches when the door is within a predetermined distance of either the open or the closed position. The inertia of the door and of the drive mechanism is overcome as the door travels the predetermined distance so that, although the door operator is not sensitive to obstructive forces within the predetermined distance, there is sensitivity to obstructive forces at other positions. Unfortunately, the door cannot be stopped and restarted at those other positions since the cutoff switches are not operative to override the safety switches in the intermediate region.

Furthermore, in typical installations, the door operator is intended to close the door to form a sealed barrier across the passageway. In many prior art door operators, however, the fully closed position is set by means of a limit switch which is activated to stop the motor. Climatic conditions, such as snow on the door threshold and temperature extremes, can result, however, in the door either being obstructed from reaching the limit switch, in which case the door is reversed, or being stopped due to activation of the limit switch before the edge of the door is sealed against the threshold.

In order to override reversal of the door before the limit switch is activated, the door operators in U.S. Pat. Nos. 2,558,808, 3,078,407 and 3,474,317 include a reverse override switch so that the door stops rather than reverses if an obstructive force is sensed within a predetermined distance of the closed position. Nevertheless, where temperature changes cause expansion or contraction of the door support structure, such as the door rails, a positive seal is not necessarily effected between the door and the threshold. Moreover, two switches, that is, a limit switch and a reverse override switch, are required which complicates installation and adds expense.

Additionally, in typical door operators, as the door moves to the open position, the motor is stopped by activation of a limit switch. Similarly, as the door moves to the closed position, the motor is stopped by activation of a limit switch. Also, as previously discussed, the motor is stopped or reversed by a safety switch if an obstacle is encountered. If the obstruction causes the door to reverse, the door moves to the open position or to the closed position, as the case may be, and the motor is stopped by activation of a limit switch.

In prior art door operators, however, if one of the switches fails, energization of the motor continues, and personal injury or property damage could result. Also, if the motor stalls due to encountering an obstruction or reaching a limit position but continues to be energized due to failure of one of the switches, damage can result from overheating.

SUMMARY OF THE INVENTION

Accordingly, one object of the present invention is to provide a door operator which can be packed and shipped economically. Moreover, another object of the present invention is to provide a control circuit which assures that the proper sequence of motor operation is established after installation of the door operator and connection of power or after a power outage and subsequent restoration of power.

A further object of the present invention is to provide a door operator which is highly sensitive to obstacles so that a very small force above the force which is represented by the door and by the drive mechanism during movement activates a safety switch to stop or reverse the motor. Also, an object of the present invention is to provide a door operator which can be stopped and restarted at any intermediate point of travel between the open and closed positions.

An additional object of the present invention is to assure that a positive seal is effected between the door and the threshold under all climatic conditions. Furthermore, an object of the present invention is to provide a closed position control which is easy to adjust and which is relatively inexpensive in comparison with the prior art combination of a reverse override switch and a closed limit switch.

Another object of the present invention is to provide a safety backup, or failsafe, in the event the limit switches fail or the safety switch fails so that injury to persons or damage to property or the motor is avoided.

In accordance with the present invention, an improved control circuit is provided for a door operator motor. The improvements in the control circuit are based on incorporation of motor sequence initialization circuitry, obstruction detection circuitry, including time delay circuitry to prevent stopping or reversing the motor when movement of the door is initiated by manual activation of the control circuit, timer circuitry to control motor operation for sealing the door against the threshold under all climatic conditions and maximum run-time circuitry to provide a safety backup in the event of failure of limit and safety switches.

If the door is not in the fully open position, then, when the power is connected or restored, the sequence of motor operation is set so that, upon subsequent activation of the control circuit, the door is opened. On the other hand, if the door is in the open position, the sequence of motor operation is merely set so that, upon subsequent activation of the control circuit, the door is closed. Consequently, the drive mechanism can be packed and shipped separately from the motor, and the sequence of motor operation is properly set by the control circuit when power is connected after installation of the door operator or restored after a power outage to thereby avoid damage to the door operator.

The time delay circuitry overrides reversal or stoppage of the motor due to activation of a safety switch when movement of the door is initiated by activation of the control circuit due to inertia of the door and of the drive mechanism at rest. Any force which exceeds the force that is represented by the door and the drive mechanism during movement activates the safety switch to reverse or stop the motor after the time delay period has expired to provide high sensitivity to obstacles. Moreover, the door can be stopped and restarted in the opposite direction at any intermediate point of travel between the open and closed positions.

Preferably, during the time delay period, further manual activation of the control circuit is operative to stop or reverse the motor. Consequently, the door can be manually stopped and then reversed within the period of the time delay so as to provide a manual safety override for the time delay circuitry.

The timer circuitry is responsive to activation of a lower position, or down limit, switch to energize the motor for an additional predetermined time, such as ⅓th second or until the safety switch is activated in response to resistance to movement of the door, such as when the door encounters the threshold. This assures that the door positively seals against the threshold. The timer circuitry facilitates adjustment of the maximum distance that the door is allowed to travel after the down limit switch is activated to threreby account for changes in location of the threshold due to climatic conditions to assure that a seal is effected between the door and the threshold.

The maximum run-time circuitry stops the motor after operation for a predetermined maximum period of time after manual activation of the control circuit. The maximum run-time circuitry stops the motor as a safety backup for the limit and safety switches if they fail to function, so as to prevent injury to persons or damage to property or the motor. Preferably, operation of the maximum run-time circuitry also activates the sequence circuitry so that the door moves in the opening direction upon subsequent activation of the control circuit.

BRIEF DESCRIPTION OF THE DRAWING

The present invention will be better understood by reference to the drawing accompanied by the description which appears below. With reference to the drawing:

FIG. 1 is an elevational view of a door operator which incorporates the features of the present invention;

FIG. 2 is a bottom cutaway view taken along line 2—2 of FIG. 1;

FIG. 3 is a cross-sectional view taken along line 3—3 of FIG. 2;

FIG. 4 is a cross-sectional view taken along line 4—4 of FIG. 2;

Referring now to the drawing, FIG. 1 shows a door operator. The door operator is shown in a typical environment, such as a garage, attached to a ceiling 11 in position to move a door 12 in either direction between a closed position, as shown in FIG. 1, wherein the door 12 covers the passageway between the header 13 and the floor 14 and an open position (not shown) wherein the door 12 is moved to an overhead position in which the door 12 is generally parallel to the floor 14. The door 12 is mounted at each side by rollers which ride in door rails that parallel the door 12 as is well known.

The improved control circuit of the present invention will be described as employed for controlling a screw type door operator although the improved control circuit of the present invention can also be employed for controlling other types of door operators, such as chain type door operators. As shown in FIG. 1, an exemplary screw type door operator 10 includes a housing 15, an elongated track 16, a screw 17, a shuttle 18 and a bracket 9 which attaches the door 12 to the shuttle 18.

Figure 6:
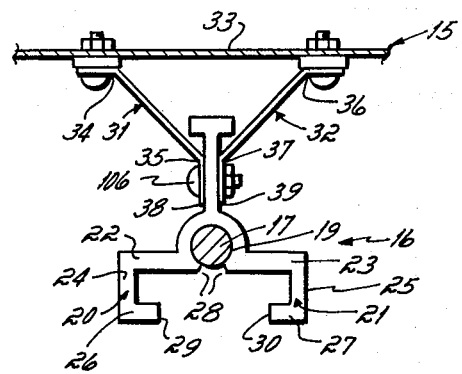
FIG. 6 is a cross-sectional view taken along line 6—6 of FIG. 2.
Figure 8:
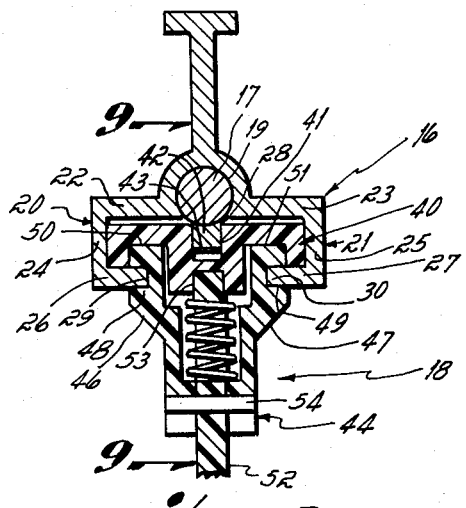
FIG. 8 is a cross-sectional view taken along line 8—8 of FIG. 7.

The cross-sectional configuration of the track 16 is shown in FIGS. 6 and 8. The track 16 includes an arcuate screw channel 19 in which the screw 17 is disposed for rotational motion with respect to the track 16. The track 16 further includes opposed U-shaped channels 20 and 21 which comprise upper flanges 22 and 23, depending vertical legs 24 and 25 and lower flanges 26 and 27, respectively.

The screw channel 19 communicates with the region as defined by the U-shaped channels 20 and 21 through a first elongated slot 28. The lower flanges 26 and 27 have respective ends 29 and 30 which define a second slot therebetween along the lower portion of the track 16.

As shown in FIG. 6, the upper cross-section of the track 16 is T-shaped so that the track 16 can be secured to a plate 33 of the housing 15 by means of brackets 31 and 32. The brackets 31 and 32 preferably have 132° bends at 34, 35, 36 and 37. The 132° bends provide sufficient clearance between the respective ends 38 and 39 of the brackets 31 and 32 so that the track 16 can be forced between the ends 38 and 39 of the brackets 31 and 32. Thereafter, a bolt and nut 106 is extended through aligned holes in the brackets 31 and 32 and the track 16 and tightened, and the 132° bends are expanded to 135° as the respective ends 38 and 39 of the brackets 31 and 32 are brought into contact with the track 16.

Figure 7:
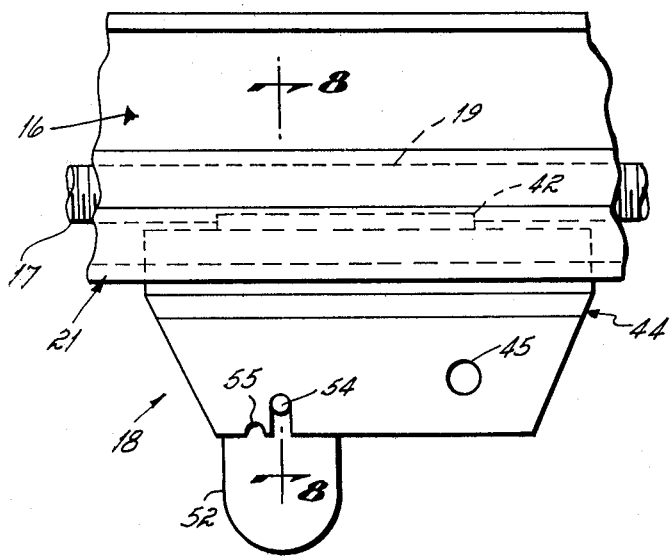
FIG. 7 is an elevational view of a drive mechanism.
Figure 9:
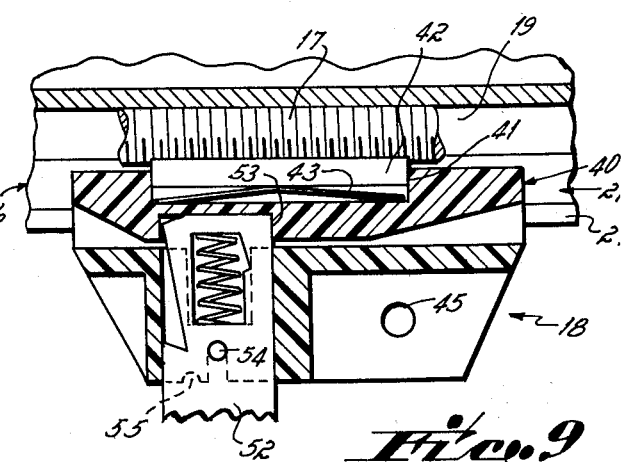
FIG. 9 is a cross-sectional view taken along line 9—9 of FIG. 8.

The shuttle 18 preferably comprises a two-piece shuttle such as that shown by way of illustration in FIGS. 7-9. The shuttle 18 includes a screw-driven traveler 40 which is slidably disposed within the U-shaped channels 20 and 21. The screw-driven traveler 40 is provided with longitudinal grooves 50 and 51 as will be described later. The screw-driven traveler 40 also is provided with a first recess 41 with a quarter nut 42 therein. The quarter nut 42, as shown in FIG. 8 and 9, is preferably urged upwardly through the elongated slot 28 into operative engagement with the screw 17 by means of a leaf spring 43. Consequently, as the screw 17 rotates, the screw-driven traveler 40 is driven within the U-shaped channels 20 and 21 of the track 16 by virtue of engagement of the quarter nut 42 with the screw 17. The direction of travel of the screw-driven traveler 40 is parallel to the longitudinal axis of the screw 17 in the reciprocal directions indicated by the double arrow A in FIG. 1.

The shuttle 18 also includes a coupling traveler 44 to which the bracket 9 is connected via an aperture 45 in the coupling traveler 44. The coupling traveler 44 includes upstanding legs 46 and 47. The upstanding legs 46 and 47 are provided with respective slots 48 and 49 in which are received the ends 29 and 30 of the lower flanges 26 and 27 of the U-shaped channels 20 and 21, respectively. Consequently, the coupling traveler 44 is slidably mounted on the lower flanges of the U-shaped channels 20 and 21 of the track 16.

As shown in FIG. 8, the longitudinal grooves 50 and 51 of the screw-driven traveler 40 receive the upstanding legs 46 and 47 of the coupling traveler 44. Consequently, when the screw-driven traveler 40 and the coupling traveler 44 are disposed at the same position along the track 16, the upstanding legs 46 and 47 of the coupling traveler 44 simply slide within the longitudinal grooves 50 and 51 of the screw-driven traveler 40 in noninterfering relationship.

In order that the door 12 may be opened and closed, the coupling traveler 44 incorporates a spring-loaded latch 52 by which the coupling traveler 44 can be releasably latched to the screw-driven traveler 40. As shown in FIG. 9, the latch 52 is in the extended, or coupled, position to couple the coupling traveler 44 to the screw-driven traveler 40 via a second recess 53 provided in the screw-driven traveler 40.

As can be seen in FIGS. 7 and 9, the latch 52 is pulled downwardly and rearwardly so that a retention pin 54 is rotated to reside within a detent 55 to uncouple the coupling traveler 44 and the screw-driven traveler 40. This permits the door 12 to be opened or closed independently of the screw 17. Further details of the two-piece shuttle as described may be found in a copending patent application, U.S. Ser. No. 833,821, filed Sept. 16, 1977, entitled "Improved Traveler Apparatus for Screw-Drive Closure Operator", assigned to the assignee of this application by named inventors Maw H. Lee and Barry V. Prehodka.

With reference now to FIG. 2, the housing 15 is shown to contain an alternating current induction motor 56. The motor 56 includes a field winding which is mounted in a motor casing 57. The motor 56 also includes a rotor which is mounted on a motor shaft 58. The motor 56 is a reversible motor.

The motor shaft 58 is journaled in bearings 59 and 60 which are mounted in support brackets 61 and 62, respectively, secured to the plate 33 of the housing 15. The field winding and motor casing 57 are rotatably supported by the motor shaft 58 by means of motor bearings (not shown).

As shown in FIG. 2, the motor shaft 58 has a first coupler section 63 secured thereto by means of a pin 64. The screw 17 has a second coupler section 65 secured thereto by means of a pin 66.

Figure 5:
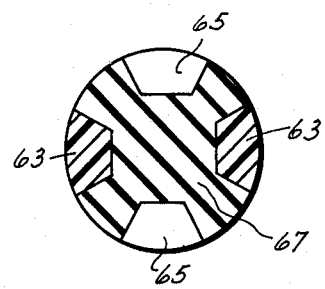
FIG. 5 is a cross-sectional view taken along line 5—5 of FIG. 2.

As shown in FIGS. 2 and 5, a spider 67 of resilient material is incorporated to interengage the coupler sections 63 and 65. Incorporation of the coupler sections 63 and 65 and the spider 67 enables the motor shaft 58 to be effectively connected to drive the screw 17 notwithstanding slight misalignment between the motor shaft 58 and the screw 17. This facilitates disassembly of the door operator 10 so that the housing 15 and the apparatus contained therein can be packed and shipped separately from the track 16, the screw 17, the shuttle 18 and the bracket 9, and then the door operator 10 can be assembled at the installation site.

Safety requires that the motor 56 be controlled if an obstacle is encountered by the door 12 during movement between the open and closed positions. If an obstacle is encountered, movement of the door 12 is arrested, and, therefore, an obstructive force is transferred through the bracket 9 to the shuttle 18 and prevents the shuttle 18 from being driven by the screw 17. Consequently, the screw 17 is prevented from rotating. Since the screw 17 is coupled to the motor shaft 58 of the motor 56, a stalled motor condition results, and the motor 56 attempts to supply the additional torque required to move the door 12.

As described previously, the motor casing 57 is rotatably mounted. As shown in FIGS. 2 and 3, a motor casing bolt 89 is disposed within slots 90 and 91 provided in brackets 92 and 93, respectively. The brackets 92 and 93 are disposed on opposite sides of the bolt 89. Each of the brackets 92 and 93 includes a flanged portion 94 and 95, respectively, through which a respective bolt 96 and 97 extends to mount each of the brackets 92 and 93 to the housing 15. Respective springs 98 and 99 are captured between the respective flanged portions 94 and 95 of the brackets 92 and 93 and respective nuts 100 and 101 on the ends of the respective bolts 96 and 97. Consequently, as shown in FIGS. 2 and 3, the brackets 92 and 93 exert opposed springloading on the bolt 89 to resist rotation of the motor casing 57.

The nuts 100 and 101 are adjusted to set the compression of the springs 98 and 99, respectively, so that the reaction torque on the motor 56 that is produced by normal movement of the door 12 between the open and closed positions is not sufficient to cause rotation of the motor casing 57. When an obstacle causes the motor 56 to supply additional torque, however, the reaction torque that is produced is sufficient to overcome the yieldable, spring-loading so that the motor casing 57 rotates in one direction or the other.

As shown in FIGS. 2 and 3, a motor casing rotation sensor means, such as a microswitch 102 with a switch arm 103, is activated by the bolt 89 when the motor casing 57 rotates in a first direction as indicated by the arrow D in FIG. 3. Also, a means, or lever, 104 which is pivotally mounted at 105 to the support bracket 61 is provided so that the bolt 89 pivots the lever 104 against the switch arm 103 to activate the microswitch 102 when the motor casing 57 rotates in a second direction as indicated by the arrow E in FIG. 3. The microswitch 102 is connected to the improved control circuit of the present invention for controlling the motor 56, such as to stop or reverse the motor 56.

As shown in FIG. 2, the housing 15 also preferably contains a position control apparatus which includes a travel nut 70 threadedly engaged with a control screw means 8. The control screw means 8 preferably comprises a separate, threaded rod 80 coupled to the motor shaft 58. The motor shaft 58 is provided with a flat 79 at the end of the motor shaft 58 on the opposite side of the motor 56 from the screw 17 as viewed in FIG. 2. The threaded rod 80 is also provided with a flat 81 at one end. The end of the threaded rod 80 with the flat 81 is coupled to the end of the motor shaft 58 with the flat 79 by means of a coupler 82. The other end of the threaded rod 80 is journaled, as in the bearing 69 mounted in the housing 15. As shown in FIG. 2, the threaded rod 80 includes substantially finer threads than the screw 17.

As shown in FIGS. 2 and 4, the travel nut 70 is preferably provided with a groove 71 which slidably cooperates with a rib 72 secured to the housing 15. This constrains the travel nut 70 against sympathetic rotational motion with the threaded rod 80. Consequently, as the motor 56 rotates the threaded rod 80, the travel nut 70 reciprocates along the threaded rod 80 in one of the directions indicated by the double arrow A in FIG. 2.

First and second position detection means, such as microswitches 73 and 74, are preferably disposed near the threaded rod 80. The microswitches 73 and 74 have respective switch arms 75 and 76 disposed in the path of movement of the travel nut 70 as the travel nut 70 reciprocates along the threaded rod 80. The microswitches 73 and 74 are pivotally mounted, as at 77 and 78, to the housing 15 so that the positions of the switch arms 75 and 76 with respect to the ends of the threaded rod 80 can be adjusted.

With reference to FIGS. 1 and 2, as the motor 56 rotates the screw 17 to drive the shuttle 18 and opens or closes the door 12, the threaded rod 80 is rotated so that the travel nut 70 reciprocates along the threaded rod 80. Consequently, as the door 12 is closed, the shuttle 18 and the travel nut 70 move in the direction of arrow B in FIGS. 1 and 2. As the door 12 is driven toward the open position, the shuttle 18 and the travel nut 70 move in the direction of arrow C in FIGS. 1 and 2.

The first and second position detection means 73 and 74 are pivotally adjusted with respect to the respective ends of the threaded rod 80 to set the closed and open positions of the door 12, respectively. That is, the microswitch, or down limit switch, 73 is pivoted about the pivot 77 so that the switch arm 75 is adjustably positioned with respect to the threaded rod 80 such that the travel nut 70 activates the down limit switch 73 as the bottom of the door 12 nears the floor 14. Also, the microswitch, or up limit switch, 74 is pivoted about the pivot 78 so that the switch arm 76 is adjustably positioned with respect to the threaded rod 80 such that the travel nut 70 activates the up limit switch 74 as the door 12 nears the open position. As such, the position control apparatus 80, 70, 72, 73 and 74 provides a mechanical analog for operation of the track 16, the screw 17, the shuttle 18, the bracket 9 and the door 12 as the motor 56 drives the door 12 between the open and closed positions. The down limit switch 73 and the up limit switch 74 are connected to the improved control circuit of the present invention for controlling the motor 56 as the door 12 nears the open and closed positions, such as to stop the motor 56. Further details in connection with the obstacle sensing apparatus and limit of travel indicating apparatus appear in copending patent application, U.S. Ser. No. 876,004, filed Feb. 8, 1978, on behalf of Maw H. Lee and Barry V. Prehodka entitled "Improved Position Control and Obstruction Detector Apparatus for a Motor-Driven Door Operator" and assigned to the same assignee as this application.

GENERAL DESCRIPTION OF IMPROVED CONTROL CIRCUIT

Figure 10:
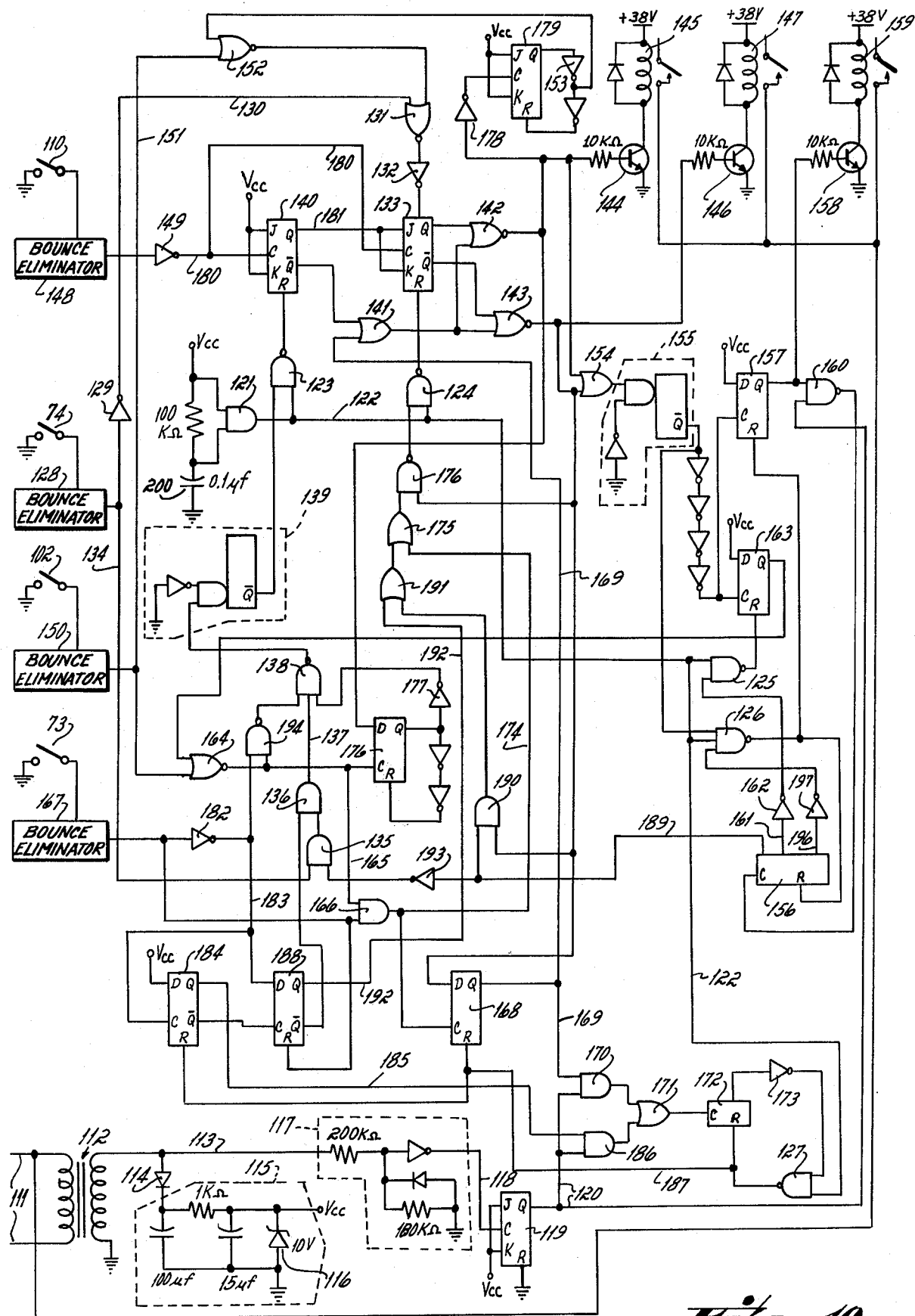
FIG. 10 is a schematic diagram of an improved control circuit in accordance with the present invention for controlling the door operator motor.

A preferred embodiment for the improved control circuit in accordance with the present invention is shown in FIG. 10 and includes a manually activated pushbutton control switch 110 which is depressed to energize the motor 56 to raise or lower the door 12. In operation, assume that the door 12 is closed and that the pushbutton control switch 110 is depressed to energize the motor 56 to open the door 12. On initiation of movement from the closed to the open position, the inertia of the door 12 and of the drive mechanism, including the screw 17, the shuttle 18 and the bracket 9, causes activation of the motor casing rotation sensor means, or safety switch 102. However, a one second time delay, for example, prevents stoppage of the motor 56 as a result of activation of the safety switch 102 due to the inertia of the door 12 and of the drive mechanism. The door 12, therefore, continues to open until the travel nut 70 on the threaded rod 80 activates the upper limit switch 74 to stop the motor 56. The pushbutton control switch 110 can be depressed a second time to stop the door 12 at any position between the closed and open positions. Another depression of the pushbutton control switch 110 causes the door 12 to move back toward the closed position.

If the door 12 is open and the pushbutton control switch 110 is depressed to close the door 12, on initiation of movement from the open to the closed position, the safety switch 102 is activated due to the inertia of the door 12 and of the drive mechanism. The time delay, however, prevents reversal of the motor 56. As the door 12 closes, the travel nut 70 activates the down limit switch 73. Thereafter, the motor 56 remains energized for a predetermined time, such as one-eighth second, or until resistance to door movement is met, whereupon the motor is stopped. The pushbutton control switch 110 can be depressed a second time to stop the door 12 at any position between the open and closed positions. Another depression of the pushbutton control switch 110 causes the door 12 to move back toward the open position.

If, after the time delay has elapsed, an obstruction is encountered as the door 12 opens, the safety switch 102 is activated, and the motor 56 is caused to stop. Subsequent depression of the pushbutton control switch 110 results in movement of the door 12 toward the closed position. If, after the time delay has elapsed, an obstruction is encountered as the door 12 closes, and the travel nut 70 has not yet activated the down limit switch 73, the safety switch 102 is activated and the motor 56 is caused to rotate in the reverse direction to reopen the door 12. If, however, the travel nut has activated the down limit switch 73, the motor 56 is caused to stop rather than reverse. In either event, if an obstruction is encountered within one second after depression of the pushbutton control switch 110 to initiate movement of the door 12 in either direction, the time delay must first expire before activation of the safety switch 102 is operative to stop or to reverse the motor 56. Nevertheless, the pushbutton control switch 110 is preferably operative upon activation for manually stopping and/or reversing the motor 56 even during the time delay period.

The improved control circuit in FIG. 10 also includes a safety backup in case the safety switch 102 or position control switches 73 and 74 do not function properly. A timer limits the amount of time which the motor 56 can operate to open or close the door 12. This amount of time, for example, may be approximately 22 seconds. If the safety switch 102 does not cause the motor 56 to stop or reverse when an obstacle is encountered, or the motor to stop after the up limit switch 74 is activated or within a predetermined time after the down limit switch 73 is activated, the timer causes the motor 56 to stop.

The improved control circuit in FIG. 10 further includes an initialization circuit to set the proper sequence of operation of the motor 56 to open or close the door 12 when power is connected after installation of the door operator 10 or is restored after a power outage. The initialization circuit functions so that, if the door 12 is in a position other than the open position, the door 12 is opened upon subsequent depression of the pushbutton control switch 110. If the door 12 is already in the fully open position, however, the sequence is set so that upon subsequent depression of the pushbutton control switch 110 and door 12 closes.

DETAILED DESCRIPTION OF IMPROVED CONTROL CIRCUIT

Considered in more detail, the preferred embodiment for the improved control circuit in accordance with the present invention, which appears in schematic-diagram form in FIG. 10, is preferably powered by an alternating current supply 111 such as provided by a household outlet. As shown in FIG. 10, the improved control circuit is preferably connected across the secondary of a transformer 112 whose primary is connected to the alternating current supply 111.

The transformed alternating current supply voltage is connected by a lead 113 to a half-wave rectifier diode 114. The diode 114 is connected to a filter 115 which includes a regulating Zener diode 116 preferably having a ten-volt avalanche characteristic. Consequently, the diode 114 and the filter 115, including the Zener diode 116, rectify and filter the transformed alternating current supply voltage to provide a ten-volt direct current supply voltage at a terminal $V_{cc}$.

The voltage at the terminal $V_{cc}$ is connected to all of the lines labeled "$V_{cc}$" in FIG. 10 as well as connected to supply the power for the various circuit elements in FIG. 10. The latter connections (not shown) are standard, and, therefore, further description of such connections is not necessary to an understanding of the present invention.

The transformed alternating current supply voltage is also connected by the lead 113 to a Schmitt trigger circuit 117 which changes the sinusoidal waveform of the transformed alternating current supply voltage into pulses having the same frequency as the alternating current supply voltage. The pulses are connected by a lead 118 to the clock input of a J-K flip-flop 119, whose J and K inputs are continuously enabled. The Q output of the J-K flip-flop 119, therefore, complements, or transposes between logic states, each time a pulse is produced by the Schmitt trigger 117. Consequently, logic one state pulses at one-half the frequency of the alternating current supply voltage appear on a line 120 at the Q output of the J-K flip-flop 119. These logic one state pulses serve as clock pulses for the improved control circuit in FIG. 10.

MOTOR SEQUENCE INITIALIZATION CIRCUITRY

When the alternating current supply is connected after installation of the door operator 10, or restored after an outage, for example, due to a storm, the sequence of operation of the motor 56 is initially set by motor sequence initialization circuitry. Specifically, when the alternating current supply is connected or restored, and before a capacitor 200 is charged to a logic one state, a logic zero state appears at one of the two inputs of an AND gate 121. Consequently, the output of the AND gate 121 assumes a logic zero state. This logic zero state changes to a logic one state when the capacitor 200 is sufficiently charged. The logic zero state is relatively short. Therefore, there is just a logic zero state pulse.

The logic zero state pulse at the output of the AND gate 121 appears on a line 122. The line 122 is connected to one of the two inputs of each of the NAND gates 123-127. The logic zero state pulse produces a logic one state pulse at the outputs of the NAND gates 123-127 to reset J-K flip-flops 133 and 140 and D flip-flops 157, 163, 168 and 184 as well as to reset counters 156 and 172 to an initial stage.

On the one hand, if the door 12 is open, the motor sequence initialization circuitry sets the sequency of operation of the motor 56 so that the next activation of the pushbutton control switch 110 causes energization of the motor 56 to close the door 12. If the door 12 is open, the up limit switch 74 is activated. When the up limit switch 74 is activated, the input of a bounce eliminator 128 is grounded, and a logic zero state appears at the output of the bounce eliminator 128. The output of the bounce eliminator 128 is connected to the input of an inverter 129. Consequently, the output of the inverter 129 assumes a logic one state when the door 12 is open.

The output of the inverter 129 is connected by a line 130 to one of the two inputs of a NOR gate 131. Since a logic one state appears at the output of the inverter 129 when the door 12 is open, the output of the NOR gate 131 assumes a logic zero state. Consequently, since the input of an inverter 132 is connected to the output of the NOR gate 131, the output of the inverter 132 assumes a logic one state so as to preset a sequence setting J-K flip-flop 133. As a result, a logic one state appears at the Q output and a logic zero state appears at the $\overline{Q}$ output of the sequence setting J-K flip-flop 133 if the door 12 is open.

Furthermore, the output of the bounce eliminator 128, which is at a logic zero state when the door 12 is open, is also connected by a line 134 to one of the two inputs of an AND gate 135. Consequently, the output of the AND gate 135 assumes a logic zero state, and this logic zero state appears at one of the two inputs of an AND gate 136. As a result, the output of the AND gate 136 in turn assumes a logic zero state.

The logic zero state at the output of the AND gate 136 is connected by a line 137 to one of the three inputs of a NAND gate 138 whose output assumes a logic one state when a logic zero state is present on the line 137.

When the output of the NAND gate 138 assumes a logic one state, a one-shot 139 is triggered. The resultant fixed duration logic zero state pulse which appears at the $\overline{Q}$ output of the one-shot 139 is connected to the other input of the NAND gate 123.

The fixed duration logic zero state pulse at the $\overline{Q}$ output of the one-shot 139 causes the output of the NAND gate 123 to assume a logic one state so as to reset an on/off J-K flip-flop 140 whose Q output assumes a logic zero state and whose $\overline{Q}$ output assumes a logic one state.

Finally, the $\overline{Q}$ output of the on/off J-K flip-flop 140 is connected to one of the two inputs of an OR gate 141. The output of the OR gate 141, which is at a logic one state subsequent to reset of the on/off J-K flip-flop 140, is connected to one of the two inputs of each of two NOR gates 142 and 143. The other input of the NOR gate 142 is connected to the Q output of the sequence setting J-K flip-flop 133. The other input of the NOR gate 143 is connected to the $\overline{Q}$ output of the sequence setting J-K flip-flop 133.

For convenience, the NOR gate 142 will be referred to as the opening control gate, since the output of the NOR gate 142 in the logic one state forwardly biases the transistor 144 so as to energize the coil of a relay 145 that operates normally open contacts which, when closed, energize the motor 56 to open the door 12. Also, for convenience, the NOR gate 143 will be referred to as the closing control gate, since the output of the NOR gate 143 in the logic one state forwardly biases the transistor 146 so as to energize the coil of a relay 147 that operates normally open contacts which, when closed, energize the motor 56 to close the door 12.

Due to the fact that the output of the OR gate 141 is at a logic one state, neither the output of the opening control gate 142 nor the output of the closing control gate 143 assumes a logic one state, and the motor 56 is not energized when the door 12 is open and the alternating current supply is connected or restored. When, however, the pushbutton control switch 110 is next activated, the input of a bounce eliminator 148 is grounded. Consequently, the output of the bounce eliminator 148 assumes a logic zero state which is connected to the input of an inverter 149. The output of the inverter 149 in turn assumes a logic one state.

The J and K inputs of the on/off J-K flip-flop 140 are continuously enabled. When the output of the inverter 149 assumes a logic one state due to activation of the pushbutton control switch 110, this logic one state appears at the clock input of the on/off J-K flip-flop 140. Consequently, the on/off J-K flip-flop 140 complements, and the resultant logic zero state at the $\overline{Q}$ output appears at one of the two inputs of the OR gate 141. As a result, a logic zero state appears at each of the inputs of the closing control gate 143, and the output of the closing control gate 143 assumes a logic one state to forwardly bias the transistor 146. Consequently, the motor 56 is energized to close the door 12.

On the other hand, if the door 12 is not fully open when the alternating current supply is connected or restored, the up limit switch 74 is not activated. Consequently, a logic one state appears at the output of the bounce eliminator 128, and, therefore, the output of the inverter 129 assumes a logic zero state. As a result, a logic zero state appears on the line 130 at one of the two inputs of the NOR gate 131.

Furthermore, the safety switch 102 is not activated, since there is no reaction torque on the motor 56 when the alternating current supply is connected or restored. Consequently, a logic one state appears at the output of a bounce eliminator 150, which is connected by a line 151 to one of the two inputs of a NOR gate 152. Consequently, the output of the NOR gate 152 assumes a logic zero state.

Since the output of the NOR gate 152 is connected to the other input of the NOR gate 131, the output of the NOR gate 131 assumes a logic one state which in turn causes a logic zero state to appear at the output of the inverter 132. Consequently, the sequence setting J-K flip-flop 133 is not present. As a result, a logic zero state appears at the Q output and a logic one state appears at the $\overline{Q}$ output of the sequence setting J-K flip-flop 133.

When the pushbutton control switch 110 is next activated, the input of the bounce eliminator 148 is grounded. This causes the output of the bounce eliminator 148 to assume a logic zero state which in turn results in the appearance of a logic one state at the output of the inverter 149.

The J and K inputs of the on/off J-K flip-flop 140 are continuously enabled. When the output of the inverter 149 assumes a logic one state due to activation of the pushbutton control switch 110, this logic one state appears at the clock input of the on/off J-K flip-flop 140. Consequently, the on/off J-K flip-flop 140 complements, and the resultant logic zero state at the Q output appears at one of the two inputs of the OR gate 141. As a result, a logic zero state appears at each of the inputs of the opening control gate 142, and the output of the opening control gate 142 assumes a logic one state to forwardly bias the transistor 144. Consequently, the motor 56 is energized to open the door 12.

In summary, the motor sequence initialization circuitry provides on the one hand that, if the door 12 is fully open, upon connection of the alternating current supply after installation of the door operator or upon restoration of the alternating current supply after an outage, the operational sequency of the motor 56 is set so the door 12 is closed when the pushbutton control switch 110 is next activated. On the other hand, if the door 12 is at any other position besides the open position, the operational sequency of the motor 56 is set so the door 12 is opened when the pushbutton control switch 110 is next activated.

INCREASED SENSITIVITY TO OBSTACLES—TIME DELAY CIRCUITRY

For high sensitivity to obstacles in the path of movement of the door 12, a very small force exceeding the force represented by the door 12 and drive mechanism in motion should activate the safety switch 102. High sensitivity can be provided by adjustment of compression of the springs 98 and 99 by tightening or loosening the nuts 100 and 101 in FIG. 2. However, the inertia of the door 12 and drive mechanism at rest also can exceed the force represented by the door 12 and drive mechanism in motion, and, therefore, the safety switch 102 can be activated due to the inertial force whenever adjustment is made for high sensitivity to obstacles.

Time delay circuitry is provided to prevent stopping or reversing the motor 56 for a limited period of time after activation of the pushbutton control switch 110 until the inertial force is overcome. However, the pushbutton control switch 110 preferably is not inhibited during the time delay period and can be activated to stop and/or reverse the motor 56 as safety requires.

Specifically, when the pushbutton control switch 110 is activated to close the door 12, the $\overline{Q}$ output of the on/off J-K flip-flop 140 assumes a logic zero state, and the output of the OR gate 141 in turn assumes a logic zero state. Also, a logic zero state appears at the $\overline{Q}$ output of the sequence setting J-K flip-flop 133. Consequently, a logic zero state appears at each of the inputs of the closing control gate 143 so that the output of the closing control gate 143 assumes a logic one state. As a result, the motor 56 is energized to close the door 12.

The logic one state at the output of the closing control gate 143 is also connected to one of the two inputs of an OR gate 154. Consequently, the output of the OR gate 154 in turn assumes a logic one state which triggers a one-shot 155. The output of the one-shot 155 produces a logic zero state pulse which is connected to one of the three inputs of the NAND gate 126. The output of the NAND gate 126, therefore, assumes a logic one state so as to reset a counter 156 as well as to preferably reset a D flip-flop 157.

The output of the one-shot 155 is also connected by an inverter chain, which provides synchronization, to the clock input of the D flip-flop 157 whose D input is continuously at a logic one state. Consequently, a logic one state appears at the Q output of the D flip-flop 157 so as to forward bias a transistor 158. This energizes the coil of a relay 159 which has normally open contacts that close to energize a light bulb.

The logic one state at the Q output of the D flip-flop 157 is also connected to one of the two inputs of a NAND gate 160. The other input of the NAND gate 160 is connected to the line 120 so that logic one state pulses appear at the output of the NAND gate 160. These logic one state pulses are connected to the clock input of the counter 156.

The time delay period during which inertial force is overcome is preselected by connection to one of the outputs of the counter 156. The time delay period, for example, is preferably one second and is preselected by connection to the output 161 of the counter 156.

Before the time delay period expires, the output 161 of the counter 156 is at a logic zero state. This logic zero state is connected to the input of an inverter 162 whose output assumes a logic one state. The output of the inverter 162 is connected to the other input of the NAND gate 125. Consequently, the output of the NAND gate 125 assumes a logic zero state, and this logic zero state appears at the reset input of a D flip-flop 163.

The D input of the D flip-flop 163 is continuously at a logic one state. Since the output of the one-shot 155 is connected by the inverter chain to the clock input of the D flip-flop 163, the Q output of the D flip-flop 163 assumes a logic one state, which appears at one of the two inputs of a NOR gate 164.

The other input of the NOR gate 164 is connected to the output of the bounce eliminator 150 whose output assumes a logic zero state when the safety switch 102 is activated. Since, however, the Q output of the D flip-flop 163 is at a logic one state, activation of the safety switch 102, such as due to the inertial force of the door 12 and drive mechanism, produces no effect for the time delay period because the logic one state at the Q output of the D flip-flop 163 disables the NOR gate 164.

After the time delay period has expired, however, the output 161 of the counter 156 assumes a logic one state, and the output of the inverter 162 in turn assumes a logic zero state. The logic zero state at the output of the inverter 162 causes the output of the NAND gate 125 to assume a logic one state which resets the D flip-flop 163. Consequently, the Q output of the D flip-flop 163 assumes a logic zero state which appears at one of the two inputs of the NOR gate 164. As a result, the NOR gate 164 is no longer disabled.

Now, if the safety switch 102 is activated due to an obstacle, the output of the NOR gate 164 assumes a logic one state. The output of the NOR gate 164 is connected by a line 165 to one of the two inputs of an AND gate 166. The other input of the AND gate 166 is connected to the output of a bounce eliminator 167 whose output assumes a logic zero state when the down limit switch 73 is activated.

If the down limit switch 73 is not activated, as is the case if the door 12 is not near the fully closed position, a logic one state appears at each of the two inputs of the AND gate 166. The output of the AND gate 166, therefore, assumes a logic one state which is connected to the clock input of a D flip-flop 168. Since the D input of the D flip-flop 168 is connected to the output of the closing control gate 143, which is at a logic one state as the door 12 closes, when the output of the AND gate 166 assumes a logic one state, the Q output of the D flip-flop 168 assumes a logic one state.

The output of the D flip-flop 168 is connected by a line 169 to the other input of the OR gate 141 whose output is connected to one of the two inputs of the closing control gate 143. Consequently, when the Q output of the D flip-flop 168 assumes a logic one state, the output of the OR gate 141 in turn assumes a logic one state. As a result, the output of the closing control gate 143 assumes a logic zero state, and the motor 56 is de-energized so that closing of the door 12 is discontinued if an obstructive force is present.

Furthermore, the output of the AND gate 166 is also connected by a line 174 to one of the two inputs of an OR gate 175. Consequently, when the output of the AND gate 166 is at a logic one state, the output of the OR gate 175 in turn assumes a logic one state. This logic one state is connected to one of the two inputs of a NAND gate 176.

So long as the output of the closing control gate 143 is at a logic one state, the other input of the NAND gate 176 is at a logic one state. As a result, the output of the NAND gate 176 assumes a logic zero state which is connected to the other input of the NAND gate 124 whose output, therefore, assumes a logic one state which resets the sequence setting J-K flip-flop 133. As a result, a logic zero state appears at the Q output and a logic one state appears at the $\overline{Q}$ output of the sequence setting J-K flip-flop 133 when an obstacle is encountered as the door 12 closes.

The Q output of the D flip-flop 168 is also connected by the line 169 to one of the two inputs of an AND gate 170. The other input of the AND gate 170 is connected to the line 120. Consequently, logic one state pulses appear at the output of the AND gate 170 and also at the output of an OR gate 171, one of whose two inputs is connected to the output of the AND gate 170.

The logic one state pulses at the output of the OR gate 171 are connected to the clock input of a counter 172. The output of the counter 172 assumes a logic one state after a preselected pulse count is accumulated, which corresponds to, for example, a time period of approximately one-eighth second. When the output of the counter 172 assumes a logic one state, the output of an inverter 173, whose input is connected to the output of the counter 172, assumes a logic zero state.

The output of the inverter 173 is connected to the other input of the NAND gate 127. Consequently, when the output of the counter 172 assumes a logic one state, the output of the NAND gate 127 in turn assumes a logic one state which resets the D flip-flop 168. As a result, the Q output of the D flip-flop 168 assumes a logic zero state which is connected by the lead 169 to one of the two inputs of the OR gate 141. The output of the OR gate 141, therefore, assumes a logic zero state.

Since the sequence setting J-K flip-flop 133 was reset upon activation of the safety switch 102 when an obstacle is encountered as the door 12 closes as described previously, when the output of the OR gate 141 assumes a logic zero state, a logic zero state appears at each of the inputs of the opening control gate 142 whose output assumes a logic one state. Consequently, the motor 56 is energized to reopen the door 12 when an obstructive force is present as the door closes.

On the other hand, when the pushbutton control switch 110 is activated to open the door 12, the $\overline{Q}$ output of the on/off J-K flip-flop 140 assumes a logic zero state and the output of the OR gate 141 in turn assumes a logic zero state. Also, a logic zero state appears at the Q output of the sequence setting J-K flip-flop 133. Consequently, a logic zero state appears at each of the inputs of the opening control gate 142 so that the output of the opening control gate 142 assumes a logic one state. As a result, the motor 56 is energized to open the door 12.

The logic one state at the output of the opening control gate 142 is connected to the other input of the OR gate 154 whose output assumes a logic one state which triggers the one-shot 155. As described previously, the result is that the Q output of the D flip-flop 163 assumes a logic one state. Consequently, activation of the safety switch 102, such as due to the inertial force of the door 12 and drive mechanism, produces no effect for the time delay period because the logic one state at the Q output of the D flip-flop 163 disables the NOR gate 164.

After the time delay period has expired, however, the D flip-flop 163 is reset so that the NOR gate 164 is no longer disabled. Now, if the safety switch 102 is activated, the output of the NOR gate 164 assumes a logic one state.

The output of the NOR gate 164 is connected to the clock input of a D flip-flop 176 whose D input is connected to the output of the opening control gate 142 which is at a logic one state when the motor 56 is energized to open the door 12. Consequently, when the output of the NOR gate 164 assumes a logic one state, the Q output of the D flip-flop 176 assumes a logic one state which is connected to the input of an inverter 177. The output of the inverter 177, therefore, assumes a logic zero state which appears at one of the three inputs of the NAND gate 138. Consequently, the output of the NAND gate 138 assumes a logic one state so as to trigger the one-shot 139.

The one-shot 139 produces a logic zero state pulse which is connected to one of the two inputs of the NAND gate 123. As a result, the output of the NAND gate 123 resets the on/off J-K flip-flop 140 so that a logic zero state appears at the Q output and a logic one state appears at the $\overline{Q}$ output of the on/off J-K flip-flop 140.

The logic one state at the $\overline{Q}$ output of the on/off J-K flip-flop 140 is connected to one of the two inputs of the OR gate 141 whose output assumes a logic one state which appears at one of the two inputs of the opening control gate 142. As a result, the output of the opening control gate 142 assumes a logic zero state, and the motor 56 is de-energized so that opening of the door 12 ceases if an obstructive force is present as the door 12 opens.

Furthermore, when the safety switch 102 is activated when an obstacle is encountered as the door 12 opens, the output of the bounce eliminator 150 assumes a logic zero state which appears at one of the two inputs of the NOR gate 152. Also, when the output of the opening control gate 142 assumes a logic zero state, the output of an inverter 178, whose input is connected to the output of the opening control gate 142, assumes a logic one state.

The output of the inverter 178 is connected to the clock input of a J-K flip-flop 179 whose J and K inputs are continuously enabled. When the output of the inverter 178 assumes a logic one state, the Q output of the J-K flip-flop 179 assumes a logic one state which is connected to the input of an inverter 153. Consequently, the output of the inverter 153 assumes a logic zero state which appears at one of the two inputs of the NOR gate 152. The output of the NOR gate 152, therefore, assumes a logic one state.

The output of the NOR gate 152 is connected to one of the two inputs of the NOR gate 131. Consequently, when the output of the NOR gate 152 assumes a logic one state, the output of the NOR gate 131 assumes a logic zero state which is connected to the input of the inverter 132. As a result, the output of the inverter 132 assumes a logic one state which presets the sequence setting J-K flip-flop 133 so that the next activation of the pushbutton control switch 110 causes energization of the motor 56 to close the door 12.

In summary, whenever opening or closing movement of the door 12 is initiated by activation of the pushbutton control switch 110, time delay circuitry prevents the inertial force due to the door 12 and drive mechanism at rest from causing the reversing of the motor 56, if the sequence is set for closing the door 12, or from causing the stopping of the motor 56, if the sequence is set for opening the door 12. The time delay circuitry is operative no matter what the position of the door 12 is between the open and closed positions when movement of the door 12 is initiated. This results in a door operator 10 with a high sensitivity to obstacles in the path of movement of the door 12 after expiration of the short time delay period, for example, one second.

MANUAL STOP AND REVERSE

At any time during movement of the door 12 in either direction and at any position of the door 12, the motor 56 can be de-energized to stop the door 12 by an additional manual activation of the pushbutton control switch 110. Furthermore, after the motor 56 is de-energized to stop the door 12 by manual activation of the pushbutton control switch 110, a further activation of the pushbutton control switch 110 energizes the motor 56 to move the door 12 in the opposite direction.

First stopping the door 12 and then restarting the door 12 in the opposite direction by manual activation of the pushbutton control switch 110 can take place even while the door 12 is moving during the one second time delay. In effect, therefore, the pushbutton control switch 110 is available to manually override the time delay circuitry if necessary for the purpose of safety.

Specifically, if the door 12 is closing, a logic one state appears at the Q output and a logic zero state appears at the $\overline{Q}$ output of the on/off J-K flip-flop 140. Also, a logic one state appears at the Q output and a logic zero state appears at the $\overline{Q}$ output of the sequence setting J-K flip-flop 133. As a result, a logic zero state appears at each of the inputs of the closing control gate 143 so that the output of the closing control gate 143 assumes a logic one state which causes energization of the motor 56 to close the door 12.

If the pushbutton control switch 110 is activated as the door 12 closes, the output of the bounce eliminator 148 assumes a logic zero state which is connected to the input of the inverter 149. Consequently, the output of the inverter 149 assumes a logic one state which is connected by a line 180 to the clock input of the sequence setting J-K flip-flop 133.

The Q output of the on/off S-K flip-flop 140 is connected by a line 181 to the J and K inputs of the sequence setting J-K flip-flop 133. When the Q output of the on/off J-K flip-flop 140 is at a logic one state, the J and K inputs of the sequence setting J-K flip-flop 133 are enabled, and the logic one state on the line 180 causes the sequence setting J-K flip-flop 133 to complement such that a logic zero state appears at the $\overline{Q}$ output and a logic one state appears at the Q output of the sequence setting J-K flip-flop 133. Consequently, a logic one state appears at one of the two inputs of the closing control gate 148, and the output of the closing control gate 143 in turn assumes a logic zero state. As a result, the motor 56 is de-energized, and closing of the door 12 is discontinued if the pushbutton control switch 110 is activated while the door 12 is closing.

Also, the output of the inverter 149 is connected by the line 180 to the clock input of the on/off J-K flip-flop 140. Since the J and K inputs of the on/off J-K flip-flop 140 are continuously enabled, a logic one state on the line 180 causes the on/off J-K flip-flop 140 to complement such that a logic zero state appears at the Q output, so as to disable the J and K inputs of the sequence setting J-K flip-flop 133, and a logic one state appears at the $\overline{Q}$ output of the on/off J-K flip-flop 140.

If the pushbutton control switch 110 is now activated once again, the output of the bounce eliminator 148 assumes a logic zero state, and the output of the inverter 149 in turn assumes a logic one state which appears at the clock input of the continuously enabled on/off J-K flip-flop 140. Consequently, the on/off J-K flip-flop 140 complements so that a logic one state appears at the Q output and a logic zero state appears at the Q output of the on/off J-K flip-flop 140. As a result, a logic zero state appears at each of the inputs of the opening control gate 142, and the output of the opening control gate 142 assumes a logic one state so that the motor 56 is energized to reopen the door 12.

On the other hand, if the door 12 is opening, a logic one state appears at the Q output and a logic zero state appears at the Q output of the on/off J-K flip-flop 140. Also, a logic zero state appears at the $\overline{Q}$ output and a logic one state appears at the $\overline{Q}$ output of the sequence setting J-K flip-flop 133. As a result, a logic zero state appears at each of the inputs of the opening control gate 142 so that the output of the opening control gate 142 assumes a logic one state which causes energization of the motor 56 to open the door 12.

If the pushbutton control switch 110 is activated as the door 12 opens, the output of the bounce eliminator 148 assumes a logic zero state which is connected to the input of the inverter 149. Consequently, the output of the inverter 149 assumes a logic one state which is connected by the line 180 to the clock input of the sequence setting J-K flip-flop 133.

The Q output of the on/off J-K flip-flop 140 is connected by the line 181 to the J and K inputs of the sequence setting J-K flip-flop 133. When the Q output of the on/off J-K flip-flop 140 is at a logic one state, the J and K inputs of the sequence setting J-K flip-flop 133 are enabled, and the logic one state on the line 180 causes the sequence setting J-K flip-flop 133 to complement such that a logic one state appears at the Q output and a logic zero appears at the $\overline{Q}$ output of the sequence setting J-K flip-flop 133. Consequently, a logic one state appears at one of the inputs of the opening control gate 142, and the output of the opening control gate 142 assumes a logic zero state. As a result, the motor 56 is de-energized, and opening of the door 12 ceases if the pushbutton control switch 110 is activated while the door is opening.

Also, the output of the inverter 149 is connected by the line 180 to the clock of the on/off J-K flip-flop 140. Since the J and K inputs of the on/off J-K flip-flop 140 are continuously enabled, the logic one state on the line 180 causes the on/off J-K flip-flop 140 to complement such that a logic zero state appears at the Q output, so as to disable the sequence setting J-K flip-flop 133, and a logic one state appears at the $\overline{Q}$ output of the on/off J-K flip-flop 140.

If the pushbutton control switch 110 is now activated once again, the output of the bounce eliminator 148 assumes a logic zero state, and the output of the inverter 149 in turn assumes a logic one state which appears at the clock input of the continuously enabled on/off J-K flip-flop 140. Consequently, the on/off J-K flip-flop 140 complements so that a logic one state appears at the Q output and a logic zero state appears at the Q output of the on/off J-K flip-flop 140. As a result, a logic zero state appears as each of the inputs of the closing control gate 143, and the output of the closing control gate 143 assumes a logic one state so that the motor 56 is energized to reclose the door 12.

In summary, consecutive activations of the pushbutton control switch 110 during movement of the door 12 in one direction cause the door, first, to stop and, second, to move in the opposite direction. This stopping and reversing of the door 12 by activation of the pushbutton control switch 110 can occur at any time and position of the door 12 during movement between the open and closed positions.

The time delay circuitry is operative each time the pushbutton control switch 110 is activated to initiate movement of the door 12 so as to prevent reversing or stopping the door 12 due to the inertial force represented by the door 12 and drive mechanism at rest. Even during the time delay period, while automatic stopping and reversing of the door 12 is overridden, nevertheless, the pushbutton control switch 110 is not inhibited. Consequently, the pushbutton control switch 110 can be activated for manually stopping and/or restarting the door 12 in the opposite direction during the time delay period, if safety requires.

FULL CLOSURE OF DOOR—TIMER CIRCUITRY

If the door 12 strikes an obstacle during closing movement before the down limit switch 73 is activated, the motor 56 is automatically reversed so as to reopen the door 12 as previously described. When, however, the door 12 nears the closed position, the down limit switch 73 is activated. Thereafter, timer circuitry causes energization of the motor 56 for at most a predetermined time to assure that the bottom edge of the door 12 reaches the floor 14. If, however, an obstructive force is met by the door 12 before the lapse of the predetermined time, which results in activation of the safety switch 102, the motor 56 is immediately de-energized to stop the door 12.

Specifically, as the door 12 closes, a logic one state appears at the Q output and a logic zero state appears at the $\overline{Q}$ output of the on/off J-K flip-flop 140. Also, a logic one state appears at the Q output and a logic zero state appears at the $\overline{Q}$ output of the sequence setting J-K flip-flop 133. As a result, a logic zero state appears at each of the inputs of the closing control gate 143, whose output assumes a logic one state to cause energization of the motor 56 to close the door 12. When the down limit switch 73 is activated as the door 12 nears the closed position, the input of the bounce eliminator 167 is grounded, and the output of the bounce eliminator 167 assumes a logic zero state. The input of an inverter 182 is connected to the output of the bounce eliminator 167. Consequently, the output of the inverter 182 in turn assumes a logic one state.

The output of the inverter 182 is connected by a line 183 to the clock input of a D flip-flop 184 whose D input is continuously at a logic one state. Consequently, when a logic one state appears on the line 183, a logic one state appears at the Q output and a logic zero state appears at the $\overline{Q}$ output of the D flip-flop 184.

The Q output of the D flip-flop 184 is connected by a line 185 to one of the two inputs of an AND gate 186. The other input of the AND gate 186 is connected to the line 120. Consequently, when the Q output of the D flip-flop 184 is at a logic one state, logic one state pulses appear at the output of the AND gate 186.

The output of the AND gate 186 is connected to the other input of the OR gate 171. As a result, logic one state pulses appear at the output of the OR gate 171 which is connected to the clock input of the counter 172.

A predetermined time after activation of the down limit switch 73, as established by the selected output of the counter 172, which is preferably one-eighth second, the output of the counter 172 assumes a logic one state. When the output of the counter 172 assumes a logic one state, the output of the inverter 173 assumes a logic zero state which in turn causes the output of the NAND gate 127 to assume a logic one state.

The output of the NAND gate 127 is connected by a line 187 to the reset input of the D flip-flop 184. Consequently, when a logic one state appears on the line 187, the D flip-flop 184 is reset so that a logic zero state appears at the Q output and a logic one state appears at the $\overline{Q}$ output of the D flip-flop 184.

Now, the $\overline{Q}$ output of the D flip-flop 184 is connected to the clock input of a D flip-flop 188 whose D input is connected to the output of the inverter 182 which assumes a logic one state when the down limit switch 73 is activated. Consequently, when the $\overline{Q}$ output of the D flip-flop 184 assumes a logic one state, a logic one state appears at the Q output and a logic zero state appears at the $\overline{Q}$ output of the D flip-flop 188.

One of the two inputs of a NAND gate 194 is connected to the output of the inverter 182 which assumes a logic one state when the down limit switch 73 is activated. However, the safety switch 102 is not normally activated, and the output of the bounce eliminator 150 is, therefore, at a logic one state which appears at one of the two inputs of the NOR gate 164. Consequently, the output of the NOR gate 164 is at a logic zero state which is connected to the other input of the NAND gate 194. As a result, the output of the NAND gate 194, which is connected to one of the three inputs of the NAND gate 138, is at a logic one state.

Furthermore, the Q output of the D flip-flop 176 is connected to the input of the inverter 177. Consequently, when the Q output of the D flip-flop 176 is at a logic zero state, the output of the inverter 177 assumes a logic one state which appears at one of the three inputs of the NAND gate 138.

Finally, as the door 12 closes, the output 189 of the counter 156 is at a logic zero state which is connected to the input of an inverter 193. The output of the inverter 193, therefore, assumes a logic one state, and this logic one stae appears at one of the two inputs of the AND gate 135. Also, the up limit switch 74 is not activated as the door 12 closes so that a logic one state appears at the output of the bounce eliminator 128 which is connected to the other input of the AND gate 135. Consequently, the output of the AND gate 135 is at a logic one state which is connected to one of the two inputs of the AND gate 136.

When, after the predetermined time, the $\overline{Q}$ output of the D flip-flop 188 assumes a logic zero state, which is connected to the other input of the AND gate 136, the output of the AND gate 136 assumes a logic zero state. Since one of the three inputs of the NAND gate 138 is connected to the output of the AND gate 136, when the output of the AND gate 136 assumes a logic zero state, the output of the NAND gate 138 assumes a logic one state which triggers the one-shot 139. As a result, the one-shot 139 produces a logic zero state pulse which causes the output of the NAND gate 123 to reset the on/off J-K flip-flop 140.

When the on/off J-K flip-flop 140 is reset, a logic zero state appears at the Q output and a logic one state appears at the $\overline{Q}$ output of the on/off J-K flip-flop 140. The logic one state at the $\overline{Q}$ output of the on/off J-K flip-flop 140 causes the output of the OR gate 141 to assume a logic one state, and, hence, a logic one state appears at one of the two inputs of the closing control gate 143. As a result, the output of the closing control gate 143 assumes a logic zero state, and the motor 56 is de-energized so that closing of the door 12 is stopped after the predetermined time elapses.

Normally, while the door 12 is closing, the output 189 of the counter 156 is at a logic zero state which appears at one of the two inputs of the AND gate 190. Therefore, the output of the AND gate 190 is at a logic zero state which appears at one of the two inputs of an OR gate 191. Also, the safety switch 102 is not normally activated so that one of the two inputs of the NOR gate 164 is at a logic one state. Consequently, the output of the NOR gate 164 is at a logic zero state which is connected to one of the two inputs of the AND gate 166. The output of the AND gate 166, which is connected to one of the two inputs of the OR gate 175, therefore, assumes a logic zero state. Furthermore, when the door 12 is closing, the output of the closing control gate 143 is at a logic one state which is connected to one of the two inputs of the NAND gate 176. Finally, shortly after power is supplied, the output of the AND gate 121 is at a logic one state which is connected to one of the two inputs of the NAND gate 124.

This means that a predetermined time after the down limit switch 73 is activated as the door 12 closes, so as to cause a logic one state to appear at the Q output of the D flip-flop 188, first, a logic one state is connected by the line 192 to the other input of the OR gate 191. A logic one state, therefore, appears at the output of the OR gate 191 which is connected to the other input of the OR gate 175. The output of the OR gate 175, therefore assumes a logic one state, and the output of the NAND gate 176 in turn assumes a logic zero state, since the output of the OR gate 175 is connected to the other input of the NAND gate 176. This logic zero state is connected to the other input of the NAND gate 124, whose output assumes a logic one state so as to reset the sequence setting J-K flip-flop 133. As a result, a logic zero state appears at the Q output and a logic one state appears at the $\overline{Q}$ output of the sequence setting J-K flip-flop 133 so that upon a subsequent activation of the pushbutton control switch 110 the motor 56 is energized to open the door 12.

If, however, the door 12 meets resistance to movement after the down limit switch 73 is activated, the motor 56 is de-energized so that the door 12 stops immediately. This occurs nothwithstanding that the predetermined time has not elapsed after activation of the down limit switch 73 as the door 12 closes.

Specifically, when resistance to further movement of the door 12 is met, the safety switch 102 is activated. Consequently, the input of the bounce eliminator 150 is grounded, and, therefore, the output of the bounce eliminator 150 assumes a logic zero state. This logic zero state appears at one of the two inputs of the NOR gate 164.

If the time delay period, which is preselected to prevent stopping or reversing of the motor 56 due to inertial forces represented by the door 12 and drive mechanism when movement is initiated, has elapsed, the other input of the NOR gate 164 is also at a logic zero state as previously described. Consequently, the output of the NOR gate 164 assumes a logic one state. This logic one state appears at one of the two inputs of the NAND gate 194.

Furthermore, when the down limit switch 73 is activated, the input of the bounce eliminator 167 is grounded, and a logic zero state appears at the output of the bounce eliminator 167. The output of the bounce eliminator 167 is connected to the input of the inverter 182, and the output of the inverter 182, therefore, assumes a logic one state which appears at the other input of the NAND gate 194.

If the safety switch 102 is activated while the down limit switch 73 is activated, a logic one state appears at each of the two inputs of the NAND gate 194, and the output of the NAND gate 194 assumes a logic zero state. Since the output of the NAND gate 194 is connected to one of the three inputs of the NAND gate 138, the logic zero state at the output of the NAND gate 194 causes a logic one state to appear at the output of the NAND gate 138. This logic one state triggers the one-shot 139 which produces a logic zero state pulse that is connected to one of the two inputs of the NAND gate 123. This logic zero state pulse causes the output of the NAND gate 123 to reset the on/off J-K flip-flop 140.

When the on/off J-K flip-flop 140 is reset, a logic zero state appears at the Q output and a logic one state appears at the $\overline{Q}$ output of the on/off J-K flip-flop 140. The logic one state at the $\overline{Q}$ output of the on/off J-K flip-flop 140 is connected to one of the two inputs of the OR gates 141 whose output, therefore, assumes a logic one state.

Since the output of the OR gate 141 is connected to one of the two inputs of the closing control gate 143, the logic one state at the output of the OR gate 141 causes a logic zero state to appear at the output of the closing control gate 143, and the motor 56 is de-energized to immediately discontinue further closing of the door 12 if resistance to movement is met as the door 12 closes after the down limit switch 73 is activated.

Furthermore, one-eighth second after the down limit switch 73 is activated, a logic one state appears at the Q output of the D flip-flop 188 to reset the sequence setting J-K flip-flop 133 through the line 192 and the gates 191, 175, 176 and 124. Upon subsequent activation of the pushbutton control switch 110, the on/off J-K flip-flop 140 complements. This results in energization of the motor 56 so as to open the door 12.

In summary, when the door 12 is closing, as the door 12 nears the closed position, the down limit switch 73 is activated. Timer circuitry thereafter continues energization of the motor 56 for a predetermined time, for example, one-eighth second, to assure that the door 12 seals against the floor 14, provided, however, that the safety switch 102 is not activated due to some obstacle in the path of the door 12 before lapse of the predetermined time. If the safety switch 102 is activated, the motor 56 is de-energized immediately to stop the door 12.

For the sake of completeness, when the door 12 is opening, a logic one state appears at the Q output and a logic zero state appears at the $\overline{Q}$ output of the on/off J-K flip-flop 140. Also, a logic zero state appears at the Q output and a logic one state appears at the $\overline{Q}$ output of the sequence setting J-K flip-flop 133. As a result, a logic zero state appears at each of the inputs of the opening control gate 142 so that the output of the opening control gate 142 assumes a logic one state which causes energization of the motor 56 to open the door 12.

When the door 12 reaches the open position, the up limit switch 74 is activated. When the up limit switch 74 is activated, the input of the bounce eliminator 128 is grounded, and the output of the bounce eliminator 128 assumes a logic zero state.

The output of the bounce eliminator 128 is connected to one of the two inputs of the AND gate 135. Consequently, when the output of the bounce eliminator 128 assumes a logic zero state, the output of the AND gate 135, which is connected to one of the two inputs of the AND gate 136, also assumes a logic zero state. The output of the AND gate 136 in turn assumes a logic zero state which is connected to one of the three inputs of the NAND gate 138. Consequently, the output of the NAND gate 138 assumes a logic one state which is connected to the input of the one-shot 139 so as to trigger the one-shot 139.

The resultant logic zero state pulse at the output of the one-shot 139 is connected to one of the two inputs of the NAND gate 123 whose output resets the on/off J-K flip-flop 140. As a result, a logic zero state appears at the Q output and a logic one state appears at the $\overline{Q}$ output of the on/off J-K flip-flop 140.

The $\overline{Q}$ output of the on/off J-K flip-flop 140 is connected to one of the two inputs of the OR gate 141. Consequently, when the $\overline{Q}$ output of the on/off J-K flip-flop 140 assumes a logic one state, the output of the OR gate 141 in turn assumes a logic one state. Therefore, a logic one state appears at one of the two inputs of the opening control gate 142. As a result, the output of the opening control gate 142 assumes a logic zero state, and the motor 56 is de-energized so that opening of the door 12 ceases when the up limit switch 74 is activated.

Also, the output of the bounce eliminator 128 is connected to the input of the inverter 129 so that, when the up limit switch 74 is activated and causes a logic zero state to appear at the output of the bounce eliminator 128, a logic one state appears at the output of the inverter 129. This logic one state appears at one of the two inputs of the NOR gate 131. Therefore, the output of the NOR gate 131 assumes a logic zero state which is connected to the input of the inverter 132. Consequently, the output of the inverter 132 assumes a logic one state which presets the sequence setting J-K flip-flop 133 so that a logic one state appears at the Q output and a logic zero state appears at the $\overline{Q}$ output of the sequence setting J-K flip-flop 133. As a result, upon a subsequent activation of the pushbutton control switch 110, the motor 56 is energized to close the door 12.

FAILSAFE MAXIMUM RUN-TIME CIRCUITRY

Maximum run-time circuitry is operative to de-energize the motor 56 in the event that the down limit switch 73, the up limit switch 74 or the safety switch 102 fails. This should be distinguished from the employment of timing circuitry in a door operator control circuit without limit and/or safety switches, wherein the timing circuitry serves to de-energize a motor after a time normally sufficient to move a door from one limit position to another depending on whether or not the door hits an obstacle. The maximum run-time circuitry in accordance with the present invention serves only as a safety backup, or failsafe.

Specifically, on the one hand, when the pushbutton control switch 110 is activated to close the door 12, the output of the closing control gate 143 assumes a logic one state which is connected to one of the two inputs of the OR gate 154. On the other hand, when the pushbutton control switch 110 is activated to open the door 12, the output of the opening control gate 142 assumes a logic one state which is connected to the other input of the OR gate 154. In either event, whether the motor 56 is energized to close or to open the door 12, a logic one state appears at either of the two inputs of the OR gate 154, and, consequently, the output of the OR gate 154 assumes a logic one state.

The output of the OR gate 154 is connected to the input of the one-shot 155. When a logic one state appears at the output of the OR gate 154, the one-shot 155 is triggered. The logic zero state pulse at the output of the one-shot 155 is, on the one hand, connected to one of the three inputs of the NAND gate 126. Consequently, a logic one state appears at the output of the NAND gate 126 and resets the counter 156.

Also, the logic zero state pulse at the output of the one-shot 155 is connected by the inverter chain to the clock input of the D flip-flop 157 whose Q output, therefore, assumes a logic one state. This logic one state is connected to one of the two inputs of the NAND gate 160, whose other input is connected to the line 120, so that logic one state pulses appear at the output of the NAND gate 160. These logic one state pulses are connected to the clock input of the counter 156 so as to increment the counter 156.

When the counter 156 is incremented to a chosen pulse count, corresponding, for example, to twenty-two seconds, a logic one state appears at the output 189 of the counter 156. The output 189 of the counter 156 is connected to the input of the inverter 193.

When a logic one state appears at the output 189 of the counter 156, the output of the inverter 193, which is connected to one of the two inputs of the AND gate 135, assumes a logic zero state. Consequently, the output of the AND gate 135 assumes a logic zero state.

Since the output of the AND gate 135 is connected to one of the two inputs of the AND gate 136, the logic zero state at the output of the AND gate 135 causes the output of the AND gate 136 to assume a logic zero state which is connected by the line 137 to one of the three inputs of the NAND gate 138. The logic zero state at the output of the AND gate 136 causes the output of the NAND gate 138 to assume a logic one state which triggers the one-shot 139.

The resultant logic zero state pulse from the one-shot 139 is connected to one of the two inputs of the NAND gate 123. Consequently, the output of the NAND gate 123 resets the on/off J-K flip-flop 140 so that a logic zero state appears at the Q output and a logic one state appears at the $\overline{Q}$ output of the on/off J-K flip-flop 140.

The $\overline{Q}$ output of the on/off J-K flip-flop 140 is connected to one of the two inputs of the OR gate 141. Consequently, when the $\overline{Q}$ output of the on/off J-K flip-flop 140 is at a logic one state, the output of the OR gate 141 assumes a logic one state. This logic one state is connected to one of the two inputs of each of the closing control gate 143 and the opening control gate 142. As a result, the output of whichever of the closing control gate 143 or opening control gate 142 that is at a logic one state prior to expiration of the maximum run-time period assumes a logic zero state so that the motor 56 is de-energized if the maximum run-time elapses.

Preferably, if the maximum run-time circuitry causes de-energization of the motor 56 as the door 12 closes, the sequence setting J-K flip-flop 133 is reset so that a subsequent activation of the pushbutton control switch 110 results in energization of the motor 56 to open the door 12. Specifically, the output 189 of the counter 156 is connected to one of the two inputs of the AND gate 190, the other input of the AND gate 190 being connected to the output of the closing control gate 143, which is at a logic one state when the motor 56 is energized to close the door 12. Consequently, if the maximum run-time elapses as the door 12 closes, the output 189 of the counter 156 assumes a logic one state so that a logic one state appears at each of the two inputs of the AND gate 190.

The output of the AND gate 190 is connected to one of the two inputs of the OR gate 191. When the output of the AND gate 190 assumes a logic one state, the output of the OR gate 191 in turn assumes a logic one state which is connected to one of the two inputs of the OR gate 175. Consequently, the output of the OR gate 175 assumes a logic one state, and this logic one state is connected to one of the two inputs of the NAND gate 176, the other of the two inputs of the NAND gate 176 being connected to the logic one state which appears at the output of the closing control gate 143 when the motor 56 is energized to close the door 12. The output of the NAND gate 176, therefore, assumes a logic zero state which is connected to one of the two inputs of the NAND gate 124. As a result, the output of the NAND gate 124 assumes a logic one state which resets the sequence setting J-K flip-flop 133.

In summary, if a limit switch fails or the safety switch fails, the maximum run-time circuitry de-energizes the motor 56 as a failsafe to prevent damage to the motor, such as from overheating. Moreover, where thermal protection is provided in the motor to prevent damage, the maximum run-time circuitry further prevents cycling of the motor due to repeated operation of the thermal protection. That is, the lapse of the maximum run-time prevents energization of the motor, although the motor cools enough to deactivate the thermal protection which otherwise would re-energize the motor when the motor cools. Prevention of cycling is provided by the maximum run-time circuitry without the need for any conventional manual reset switches or other reset means. Preferably, the sequence of operation for the motor 56 is set by the maximum run-time circuitry so that, no matter whether the motor 56 is energized to open or to close the door 12 at the time that the maximum run-time circuitry is activated, a subsequent activation of the pushbutton control switch 110 causes energization of the motor 56 to open the door 12 so as to prevent the door from being driven downwardly against an obstacle.

The previously mentioned light bulb is illuminated until the counter 156 is incremented to a pulse count which corresponds, for example, to three minutes, whereupon the output 196 of the counter 156 assumes a logic one state. The output 196 of the counter 156 is connected to the input of an inverter 197. When a logic one state appears at the output 196 of the counter 156, a logic zero state appears at the output of the inverter 197 which is connected to one of the three inputs of the NAND gate 126. Consequently, the output of the NAND gate 126 assumes a logic one state which resets the D flip-flop 157 so that a logic zero state appears at the Q output. This logic zero state causes the light bulb to be extinguished.

For simplicity, the element 110 has been described as a pushbutton control switch. The pushbutton control switch 110 can take any form, such as a manually activated momentary switch or a radio-controlled relay activated by a manually actuated switch or any manual remotely controlled switch closure means.

In summary, the present invention provides an improved control circuit for a door operator which includes a motor-driven mechanism to move a door between an open position and a closed position in response to activation of the control circuit. The control circuit includes circuitry to initialize the sequence of operation of the motor upon connection of power after installation of the door operator or restoration of power after a power outage. Time delay circuitry cooperates with obstruction detection circuitry to prevent stopping or reversing the motor due to the inertia of the door and of the drive mechanism upon manual activation of the control circuit to open or close the door but, at all other times, to provide a high sensitivity to obstacles in the path of movement of the door. During the time delay period, however, if an emergency requires override, manual activation of the control circuit is operative to stop and/or reverse the door. As the door moves in one direction, movement can be stopped and restarted in the opposite direction upon consecutive manual activations of the control circuit. As the door nears the closed position, timer circuitry is activated to energize the motor for a predetermined time or until sufficient resistance to door movement is met to operate the obstruction detection circuitry whereupon the motor is stopped. Maximum run-time circuitry is also included to set the maximum time allowable for energization of the motor to move the door in either direction between the open and closed positions as a failsafe in the event of failure of the limit switches or safety switch.

The present invention provides a reliable and safe control circuit for a door operator motor and facilitates installation of the door operator. While the improved control circuit has been illustrated for controlling one type of door operator, namely, a screw type door operator, any type of door operator can be similarly controlled.

The above and other advantages and modifications will become readily apparent to one of ordinary skill in the art without departure from the scope of the present invention, and applicants intend to be bound only by the appended claims.

We claim:

1. An improved control circuit for a motor-driven door operator comprising:
    an up limit switch activated when the door is in an open position,
    motor sequence initialization circuitry connected to the up limit switch and to an external power supply and responsive to connection of power after the door operator is installed and responsive to restoration of power after a power outage for setting the sequence of operation of a selectively energizable reversible motor so the motor is initially energized for actuating a drive mechanism to move the door toward a closed position when the control circuit is activated if the up limit switch is activated and so the motor is initially energized for actuating the drive mechanism to move the door toward the open position when the control circuit is activated if the up limit switch is not activated,
    a selectively activated control switch for activating the control circuit to energize the motor for actuating the drive mechanism to move the door between the open and closed positions,
    time delay circuitry connected to the control switch and responsive to activation of the control switch for timing a predetermined time delay period,
    a safety switch activated by yieldable means actuable when the force on the drive mechanism exceeds a force represented by the door and the drive mechanism in motion,
    a down limit switch activated as the door closes near the closed position,
    obstruction detection circuitry connected to the safety switch, the down limit switch and the time delay circuitry and responsive to expiration of the time delay period for energizing the motor so that, if the safety switch is activated while the door moves toward the closed position after the time delay period expires and the down limit switch is not activated, the motor actuates the drive mechanism to move the door toward the open position and for de-energizing the motor if the safety switch is activated while the door moves toward the open position after the time delay period expires, timer circuitry connected to the down limit switch and to the safety switch and responsive to activation of the down limit switch for energizing the motor no more than a predetermined additional time for actuating the drive mechanism to move the door toward the closed position and responsive to activation of the safety switch for de-energizing the motor, the up limit switch being activated as the door opens near the open position for de-energizing the motor, and maximum run-time circuitry connected to the up and down limit switches, the safety switch and the control switch for de-energizing the motor in the event that one of the up and down limit switches and/or safety switch fails and energization of the motor continues after a maximum predetermined time elapses following activation of the control circuit and for setting the sequence of operation of the motor so the motor is energized for actuating the drive mechanism to move the door toward the open position when the control circuit is activated.

2. The control circuit of claim 1 including:

a continuously enabled on/off flip-flop having an input connected to the control switch, a reset input and first and second outputs, a sequence setting flip-flop having enabling inputs connected to the first output of the on/off flip-flop, an input connected to the control switch, a preset input, a reset input and first and second outputs, a closing control gate having inputs respectively connected to the second output of the on/off flip-flop and to the first output of the sequence setting flip-flop and an output for energizing the motor for actuating the drive mechanism to move the door toward the closed position, an opening control gate having inputs respectively connected to the second output of the on/off flip-flop and to the second output of the sequence setting flip-flop and an output for energizing the motor for actuating the drive mechanism to move the door toward the closed position, the sequence setting flip-flop being preset upon connection or restoration of power when the door is open, upon activation of the safety switch after the time delay period expires as the door moves toward the open position and when the up limit switch is activated as the door opens near the open position, the sequence setting flip-flop being reset upon activation of the safety switch after the time delay period expires as the door moves toward the closed position, at the end of a predetermined additional time after activation of the down limit switch as the door moves toward the closed position and if energization of the motor continues after a maximum predetermined time elapses following activation of the control circuit, the on/off flip-flop being reset upon connection or restoration of power, upon activation of the safety switch after the time delay period expires as the door moves toward the open position, when the up limit switch is activated as the door opens near the open position, at the end of a predetermined additional time after activation of the down limit switch as the door moves toward the closed position and if energization of the motor continues after a maximum predetermined time elapses following activation of the control circuit.

3. The door operator of claim 1 or 2 further including adjustment means connected to the yieldable means for preadjusting the yieldable means so that a force in excess of a force represented by the door and the drive mechanism in motion actuates the yieldable means to activate the safety switch.

4. The door operator of claim 1 or 2 wherein a further activation of the control switch at any time while the door is moved in one direction de-energizes the motor and wherein activation of the control switch once again energizes the motor for actuating the drive mechanism to move the door in an opposite direction.

5. A method for controlling a motor-driven door operator including the steps of:

activating an up limit switch when the door is in an open position, responding to connection of power after the door operator is installed and responding to restoration of power after a power outage for setting the sequence of operation of a selectively energizable reversible motor so the motor is initially energized for actuating a drive mechanism to move the door toward a closed position when a control circuit is activated if the up limit switch is activated and so the motor is initially energized for actuating the drive mechanism to move the door toward the open position when the control circuit is activated if the up limit switch is not activated, activating the control circuit to energize the motor for actuating the drive mechanism to move the door between the open and closed positions, responding to activation of the control circuit for timing a predetermined time delay period, activating a safety switch by yieldable means actuable when the force on the drive mechanism exceeds a force represented by the door and the drive mechanism in motion, activating a down limit switch as the door closes near the closed position, responding to expiration of the time delay period for energizing the motor so that, if the safety switch is activated while the door moves toward the closed position after the time delay period expires and the down limit switch is not activated, the motor actuates the drive mechanism to move the door toward the open position and for de-energizing the motor if the safety switch is activated while the door moves toward the open position after the time delay period expires, responding to activation of the down limit switch for energizing the motor no more than a predetermined additional time for actuating the drive mechanism to move the door toward the closed position and responding to activation of the safety switch for de-energizing the motor, activating the up limit switch as the door opens near the open position for de-energizing the motor, and de-energizing the motor in the event that one of the up and down limit switches and/or safety switch fails and energization of the motor continues after a maximum predetermined time elapses following activation of the control circuit and for setting the sequence of operation of the motor so the motor is energized for actuating the drive mechanism to move the door toward the open position when the control circuit is activated.

6. The method of claim 5, the door operator further including adjustment means connected to the yieldable means, the method further including the step of preadjusting the yieldable means so that a force in excess of a force represented by the door and the drive mechanism in motion actuates the yieldable means to activate the safety switch.

7. The method of claim 5 further including the steps of de-energizing the motor upon a further activation of the control switch at any time while the door is moved in one direction and energizing the motor for actuating the drive mechanism to move the door in an opposite direction upon another activation of the control switch.

* * * * *